United States Patent
Vispute et al.

(10) Patent No.: US 11,100,034 B1
(45) Date of Patent: Aug. 24, 2021

(54) DUAL INTEGRATED GATE-DRIVER WITH REVERSE CURRENT FAULT PROTECTION FOR USB TYPE-C AND USB POWER DELIVERY

(71) Applicant: Cypress Semiconductor Corporation, San Jose, CA (US)

(72) Inventors: Hemant P. Vispute, Bangalore (IN); Ramakrishna Venigalla, Bangalore (IN); V. M. Saravanan, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/911,632

(22) Filed: Jun. 25, 2020

Related U.S. Application Data

(60) Provisional application No. 62/979,909, filed on Feb. 21, 2020.

(51) Int. Cl.
*G06F 13/40* (2006.01)
*G06F 1/26* (2006.01)
*G06F 13/42* (2006.01)

(52) U.S. Cl.
CPC .......... *G06F 13/4072* (2013.01); *G06F 1/266* (2013.01); *G06F 13/4282* (2013.01); *G06F 2213/0042* (2013.01)

(58) Field of Classification Search
CPC ... G06F 13/4072; G06F 1/266; G06F 13/4282
See application file for complete search history.

(56) References Cited

U.S. PATENT DOCUMENTS

| | | | |
|---|---|---|---|
| 6,465,909 B1 * | 10/2002 | Soo | H02J 1/102 307/52 |
| 9,088,158 B2 | 7/2015 | Maggio et al. | |
| 10,097,027 B2 | 10/2018 | Mao | |
| 10,177,755 B2 | 1/2019 | Dreps | |
| 10,348,193 B1 | 7/2019 | Cohen | |

(Continued)

FOREIGN PATENT DOCUMENTS

CN 208062831 U 11/2018

OTHER PUBLICATIONS

"ISL9241 Buck-Boost Configurable Battery Charger with SMBus Interface and USB Power Delivery," Renesas Datasheet, Jul. 23, 2020, pp. 1-74; 74 pages.

(Continued)

*Primary Examiner* — Tim T Vo
*Assistant Examiner* — Phong H Dang

(57) ABSTRACT

A dual-integrated gate-driver with reverse current protection (RCP) fault protection is described. A Universal Serial Bus Type-C (USB-C) controller includes a first terminal, a second terminal, and a dual-gate driver. The dual-gate driver drives a first power field effect transistor (FET) coupled to the first terminal and a second power FET coupled to the second terminal. The first power FET and the second power FET are connected in series between a voltage bus (VBUS_C) terminal of a USB Type-C connector and a voltage supply to deliver power to the VBUS_C terminal. A breakdown voltage of each of the first power FET and the second power FET is less than 20 volts. The dual-gate driver controls the first power FET and the second power FET in response to at least one of a short circuit event or a reverse current event.

19 Claims, 6 Drawing Sheets

(56) References Cited

U.S. PATENT DOCUMENTS

| | | | |
|---|---|---|---|
| 10,622,979 B2 | 4/2020 | Jiang et al. | |
| 2008/0204958 A1* | 8/2008 | Shearon | H02H 3/18 |
| | | | 361/93.9 |
| 2016/0190794 A1* | 6/2016 | Forghani-Zadeh | H02H 9/048 |
| | | | 361/86 |
| 2016/0285448 A1* | 9/2016 | Fugere | H03K 17/18 |
| 2017/0317583 A1* | 11/2017 | Forghani-Zadeh | |
| | | | H03K 17/04206 |
| 2017/0351320 A1* | 12/2017 | Nayak | G06F 13/385 |
| 2019/0074698 A1 | 3/2019 | Singhal et al. | |
| 2019/0089258 A1 | 3/2019 | Giuliano et al. | |
| 2019/0131963 A1 | 5/2019 | Gong et al. | |
| 2019/0140631 A1* | 5/2019 | Manohar | H03K 17/145 |
| 2019/0216307 A1 | 7/2019 | Coon et al. | |
| 2019/0278731 A1* | 9/2019 | Mattos | G06F 1/26 |
| 2020/0067304 A1 | 2/2020 | Kim | |
| 2020/0119540 A1* | 4/2020 | Buhari | G06F 13/4282 |

OTHER PUBLICATIONS

"TPS65983B USB Type-C and USB PD Controller, Power Switch, and High Spped Multiplexer," Texas Instruments, Jun. 1, 2018, pp. 1-120; 120 pages.

* cited by examiner

US 11,100,034 B1

DUAL INTEGRATED GATE-DRIVER WITH REVERSE CURRENT FAULT PROTECTION FOR USB TYPE-C AND USB POWER DELIVERY

RELATED APPLICATIONS

This application claims the benefit of U.S. Provisional Application No. 62/979,909, filed Feb. 21, 2020, the entire contents of which are incorporated by reference.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification, however, allows power providers and power consumers to dynamically negotiate the levels of the provided voltages and currents. Under certain power delivery conditions, fault conditions can occur on the provided voltages/currents from the power provider, as well as other fault conditions can occur on the provided voltages/currents received by the power consumer.

BRIEF DESCRIPTION OF THE DRAWINGS

The disclosure is illustrated by way of example, and not of limitation, in the figures of the accompanying drawings.

DETAILED DESCRIPTION

Figure 1:
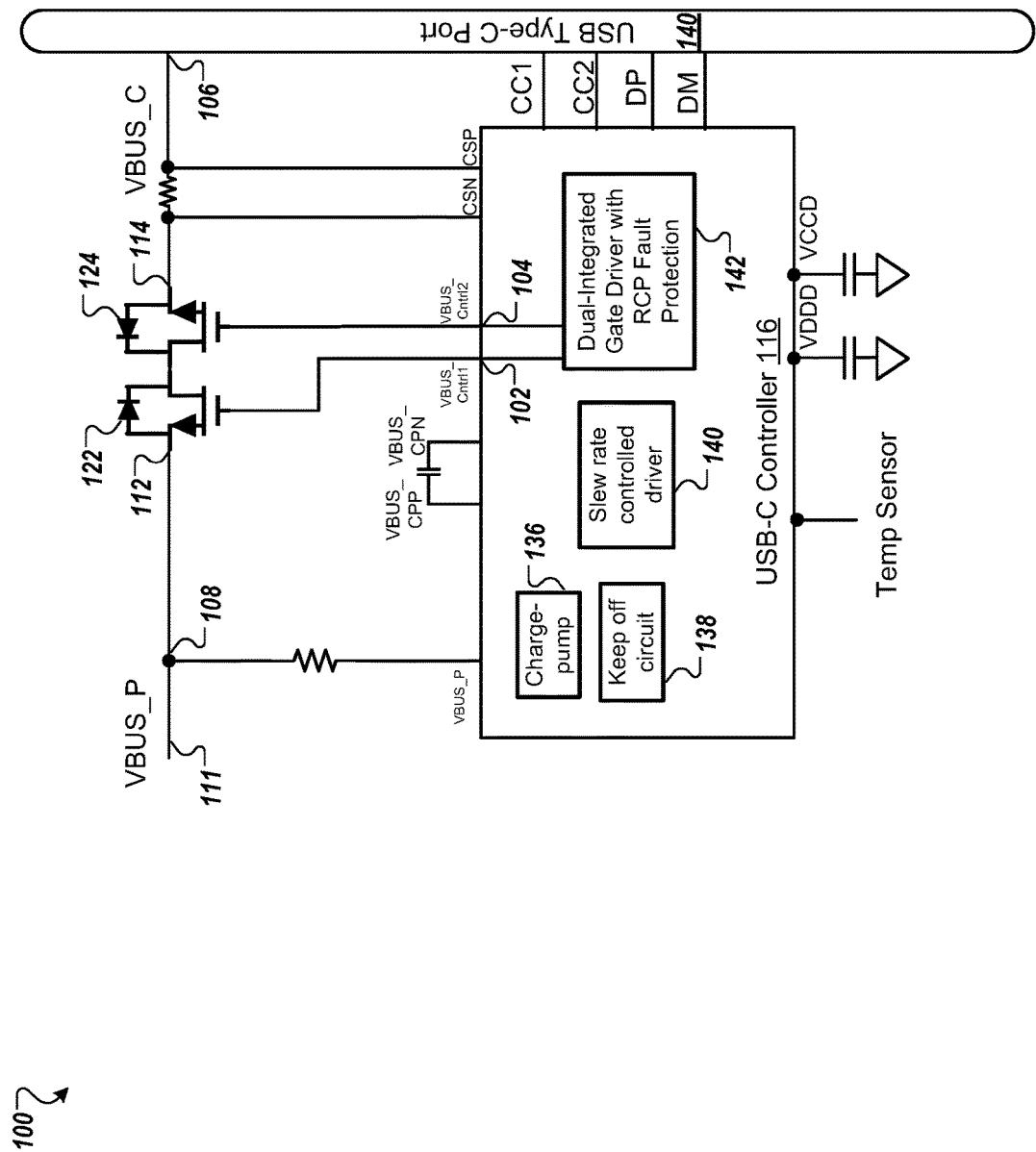
FIG. 1 is a block diagram of a Universal Serial Bus Power Delivery (USB-PD) power adapter with a dual-gate driver with reverse current protection (RCP) and short circuit protection according to one embodiment.

The following description sets forth numerous specific details such as examples of specific systems, components, methods, and so forth, in order to provide a good understanding of various embodiments of the techniques described herein for providing reverse current protection (RCP) and short circuit (SCP) fault protection with a dual-integrated gate driver such as used in USB power delivery (PD) applications. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples" are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for providing RCP and SCP fault protection with a dual-integrated gate driver in electronic devices in USB-PD. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery. The embodiments described herein can be used for alternating current to direct current (AC-DC) USB Type-C power adapters with a provider FET (e.g., a pass gate FET, an N-channel FET (NFET) switch), AC-DC power adapters, Type-C/PD products using a provider FET for a provider or consumer path, power-adapter solutions along with Type-C PD capability, and USB Type-C compliant DC-DC power providers and/or suppliers with provider FET. These embodiments can improve reliability while having fewer board components, reducing the overall cost of the system by reducing the overall bill of material (BOM) and further reducing the controller board size. A feature-rich USB-C NFET gate driver with programmable slew rate control may enable a customer to enhance their system design.

A USB-enabled electronic device or a system may comply with at least one release of the USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C, is defined in various releases and/or versions of the USB Type-C specification. The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled in-line on the VBUS line and configured to turn the delivery of power on and off.

A USB-PD power source may be configured to draw power from an alternating current (AC) power adapter or from another AC source. Thus, as part of an alternating current-to-direct current (AC-DC) conversion, some implementations may use a large bulk capacitor on the power source side of the VBUS line in order to remove the AC component of the power signal. Turn-ON and turn-OFF of power switches (also referred to as power FETs) may allow for further circuit protection based on analysis of current and voltage conditions and the detection of faults.

With a USB-C power adapter, a USB-C controller needs to drive a gate of a power FET to deliver power on a USB-C port for charging a consumer device. These power FETs need to be capable of handling power delivery of up to 20V and faults up to 24V (also referred to as a gate-source breakdown voltage, or VGS gate breakdown voltage). A first type of FET is designed to have a VGS gate breakdown voltage of 24V while a second type of FET is designed to have a VGS breakdown voltage of between 5V and 10V. The second type of FET can be up to three to four times cheaper (less expensive) than the first type of FET. Some solutions can implement two separate gate drivers, such as n-channel FET gate driver outputs (NGDOs) to drive external power FETs. However, using two separate gate drivers leads to an area penalty by taking up additional space on the chip. Further, such a solution still requires to use the first type of FET that is more expensive, thus increasing the bill of material (BOM) cost.

Described herein are various embodiments of techniques for providing RCP and SCP fault protection with a dual-integrated gate driver on a USB-C controller. The embodiments described herein may address the above-mentioned and other challenges by providing a dual-integrated gate driver on a USB-C controller that can offer fault protection up to 20V for the second type of FET, which is capable of delivering power up to 20V without the additional logic and circuits and complicated protocols described above. The embodiments described herein can allow for the use of the second type of FET that is cheaper and can reduce the BOM cost while still supporting all system level fault handling. The embodiments described herein provide system level fault protection, including RCP, short circuit protection (SCP), over-current protection (OCP), over-voltage protection (OVP), and the like. The dual-integrated gate driver drive two external power FETs (NFETs) connected in series to provide RCP. The embodiments described herein can offer NFET safe operating area (SOA) protection for NFETs with a lower VGS breakdown voltage during RCP events. The embodiments described herein provide techniques for quickly turning off power FETs in the event that a system level fault occurs. The embodiments described herein provide inrush current control while turning on power FETs. The embodiments described herein can also be implemented in other types of power adapters, power converters, power delivery circuits, or the like.

FIG. 1 is a block diagram of a USB-PD power adapter 100 with a dual-gate driver 142 with RCP and short circuit protection according to one embodiment. RCP is also referred to as reverse current fault protection or RCP fault protection herein. The dual-gate driver 142 is a dual-integrated gate-driver. The USB-PD power adapter 100 includes a USB-C controller 116. The USB-C controller 116 may be disposed in a chip package and includes a USB-PD subsystem configured in accordance with the techniques for RCP fault protection described herein. The USB-C controller 116 is configured to negotiate a PD contract with a consumer device (not shown) attached to USB Type-C port 140 and to control through an output pin the required VBUS voltage that is output. USB Type-C port 140 is can also be referred to as a USB Type-C connector and is typically associated with a Type-C plug, but it should be understood that in various embodiments the USB Type-C port may be associated with a Type-C receptacle instead.

The USB-C controller 116 includes a charge-pump circuit 136, a keep off circuit 138, a slew-rate controller 140, and an integrated dual-gate driver 142 to provide RCP protection. The slew rate controller 140 is coupled between the charge-pump circuit 136 and the dual-gate driver 142. The dual-gate driver 142 is integrated on the USB-C controller 116. The dual-gate driver 142 drives a power field effect transistor (FET) 112 that is coupled to a terminal 102 of the USB-C controller 116 and a power FET 114 that is coupled to a terminal 104 of the USB-C controller 116. The power FET 112 can be an external FET or a chip FET disposed or integrated within the chip or package. A diode 122 is coupled to the power FET 112 and a diode 124 is coupled to the power FET 114. The power FET 112 and the power FET 114 are connected in series between a voltage bus (Vbus) terminal 106 of the USB-C connector 140 and a voltage supply terminal 108. The voltage supply delivers power to the Vbus terminal 106. A gate source (VGS) breakdown voltage of each of the power FET 112 and the power FET 114 is less than 20 volts (V) (e.g., 5V, 9V, 12V, 15V, or other appropriate voltage rated FET). The dual-gate driver 142 is configured to control the power FET 112 and the power FET 114 in response to at least one of a short circuit event or a reverse current event. The power FET 112 and the power FET 114 are external FETs (e.g., they are not integrated on the USB-C controller 116). In other embodiments, the charge-pump circuit 136, the keep off circuit 138, and the slew-rate controller 140 are part of the dual-gate driver 142 rather than separate components as depicted in FIG. 1.

In another embodiment, the USB-C controller 116 includes a first gate driver and a second gate driver to provide RCP protection. The first gate driver is coupled to a first power FET that is coupled to a first terminal of the USB-C controller 116. The second gate driver is coupled to a second power FET that is coupled to a second terminal of the USB-C controller 116. The first gate driver and the second gate driver are integrated gate drivers. A first diode is coupled to the first power FET and a second diode is coupled to the second power FET. The first power FET and the second power FET are connected in series between a voltage bus (Vbus) terminal 106 of the USB-C connector 140 and a voltage supply terminal 108. The first power FET and the second power FET are external FETs (e.g., they are not part of the USB-C controller 116). The voltage supply delivers power to the Vbus terminal 106. A VGS breakdown voltage of each of the first power FET and the second power FET is substantially less than 20V. The first gate driver and the second gate driver are configured to control the first power FET and the second power FET in response to at least one of a short circuit event or a reverse current event.

In the depicted embodiment, the power FET 112 and the power FET 114 are NFETs. In other embodiments, the power FET 112 and/or the power FET 114 can be PFETs or other types of transistors.

In one embodiment, a rectified DC power source can be coupled to a first power FET and a second power FET. The first power FET and the second power FET are coupled in series. The VBUS_P can be regulated by an error amplifier. The USB-PD power adapter 100 may also include a pulse transformer (or other feedback control mechanisms) for communicating information across an isolation barrier.

The integrated dual-gate driver 142 is integrated on the USB-C controller 116 and is coupled to a VBUS line 111 and is configured to control the operation and state of power switches (such as the power FET 112 and the power FET 114 herein). When fault conditions are detected the integrated dual-gate driver 142 can provide control signals to the gate of the power switches.

In operation, the direction of power flow on the VBUS line 111 is from the voltage supply terminal 108 to a consumer device connected at the Vbus terminal 106, such as a laptop computer (not shown), that is attached to USB Type-C port 140. When a PD contract with the consumer device is negotiated, the USB-C controller 116 turns on the power FET 112 and the power FET 114 to provide power to the consumer device at the negotiated voltage and/or current level(s). A high-to-low voltage transition on VBUS line 111 may be needed when the PD contract is dynamically re-negotiated to lower the VBUS voltage and/or current, e.g., when the consumer device has finished charging its battery and now needs power only to operate.

In one embodiment, on detection of fault conditions, a control signal may be sent to limit the gate-source voltage of power FET 112 and the power FET 114 and to turn off the power FET 112 and the power FET 114, thereby disconnecting the USB Type-C port 140 from the voltage supply. The power FET 112 and the power FET 114 can be turned off by driving the output of VBUS_Controls at the terminal 102 and the terminal 104 to zero respectively. By limiting the gate source voltage of the power FET 112 and the power FET 114, the FETs are protected from getting damaged. This disconnection may be caused by an over-voltage condition, an over-current condition, or other conditions that may require disconnection of the USB Type-C port 140 from the voltage supply terminal 108 for protection of circuits coupled to the USB Type-C port 140.

Though not illustrated, in some embodiments, a PWM driver circuit of the USB-C controller 116 can output a signal on an output pin to communicate information to turn on or turn off the power FET 112 and the power FET 114.

In one embodiment, the USB-PD power adapter 100 can be an AC-DC power adapter device that includes a flyback converter (with a flyback transformer) or an isolated power converter that is coupled between AC terminals and DC terminals. The flyback transformer converts AC power on the AC terminals to DC power on the DC terminals with galvanic isolation between the AC terminals and the DC terminals. The AC-DC power adapter device can also include a primary-side controller coupled to the flyback transformer and a secondary-side controller coupled to the flyback transformer. A primary-side power switch (also referred to as primary-side switching FET or primary FET) is coupled to a primary winding of the flyback transformer and the primary-side controller. A secondary-side power switch is coupled to a secondary winding of the flyback transformer and the secondary-side controller. The primary-side controller is configured to receive a first signal from the secondary-side controller across a galvanic isolation barrier and apply a second signal to the primary-side power switch in response to the first signal to turn-on and turn-off the primary-side power switch. The secondary-side controller is also configured to communicate information to the primary-side controller across the pulse transformer, as described herein.

In a further embodiment, the AC-DC power adapter device includes a pulse transformer coupled between the primary-side controller and the secondary-side controller. The primary-side controller is configured to receive the first signal from the secondary-side controller as one or more pulses via the pulse transformer. The primary-side controller can detect when the secondary-side controller is communicating information via the pulse transformer as described herein.

The embodiments described herein can be implemented in a power delivery system, such as a serial bus-compatible power supply device. An example of a serial bus-compatible power supply device may include a serial bus power delivery (SBPD) device, a USB-compatible power supply device, or the like. In some embodiments, SBPD device is USB-PD device that is compatible with the USB-PD standard or more generally with the USB standard. For example, SBPD device may be used to provide an output voltage (e.g., Vbus_c, power supply voltage) based on an input voltage (e.g., Vbus_in, power supply voltage). The SBPD device may include the various embodiments described herein to facilitate communications between a primary-side controller and a secondary-side controller. The SBPD device may include a power converter (e.g., an AC-DC converter) and a power control analog subsystem (e.g., a USB-PD controller). The power control analog subsystem may include the circuitry, functionality, or both, as described herein for communicating information across a galvanic isolation barrier. The information can include information for different functions, such as OV, UV, OCP, SCP, PFC, SR, or the like. The information can include fault information for any of these different functions.

In embodiments, SBPD device is connected to a power source, such as a wall socket power source that provides AC power. In other embodiments, the power source may be a different power source, such as a battery, and may provide DC power to SBPD device. The power converter may convert the power received from power source (e.g., convert power received to Vbus_in, which may range from 3.3V to 21.5V). For example, power converter may be an AC-DC converter and convert AC power from power source to DC power. In some embodiments, power converter is a flyback converter, such as a secondary-controlled flyback converter, that provides galvanic isolation between the input (e.g., primary side) and the output (e.g., secondary side). In another embodiment, the device may be a consumer device receiving power from the SBPD device, wherein the consumer device may control the gate-source voltage of its provider FET with a secondary gate driver integrated onto the secondary-side controller of the consumer device.

In some embodiments, SBPD device provides Vbus_c to a sink device (e.g., via communication channel (CC) specifying a particular output voltage, and possibly an output current). SBPD device may also provide access to ground potential (e.g., ground) to the sink device. In some embodiments, the providing of the Vbus_c is compatible with the USB-PD standard. Power control analog subsystem may receive Vbus_in from the power converter. The power control analog subsystem may output Vbus_in. In some embodiments, the power control analog subsystem is a USB Type-C controller compatible with the USB Type-C standard. The power control analog subsystem may provide system interrupts responsive to the Vbus_in and the Vbus_c.

In some embodiments, any of the components of SBPD device may be part of an IC or alternatively any of the components of SBPD device may be implemented in its own IC. For example, the power converter and the power control analog subsystem may each be discrete ICs with separate packaging and pin configurations.

In some embodiments, the SBPD device may provide a complete USB Type-C and USB-Power Delivery port control solution for notebooks, dongles, monitors, docking stations, power adapters, vehicle chargers, power banks, mobile adaptors, and the like.

Figure 2:
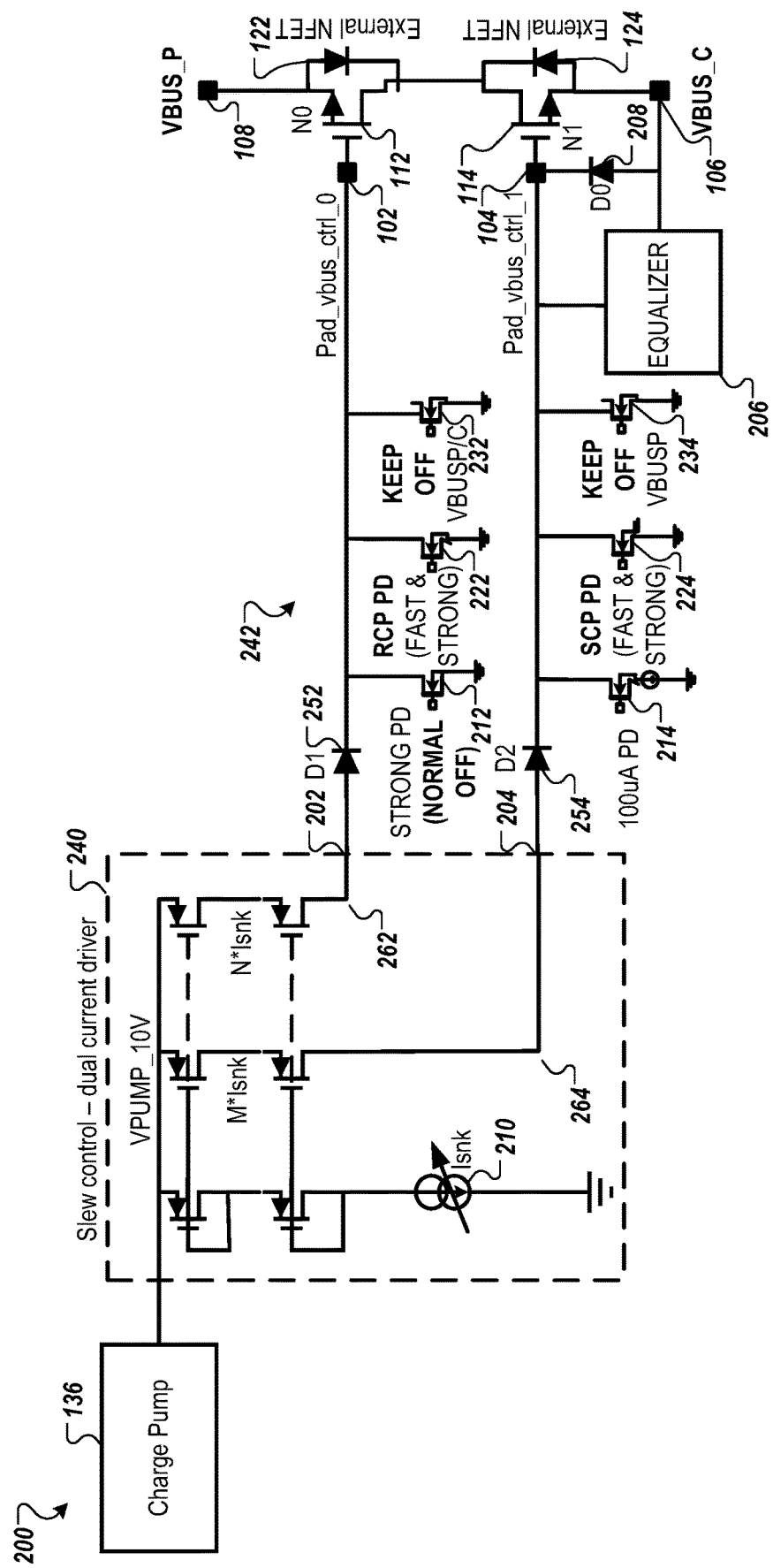
FIG. 2 is a schematic diagram of a USB-PD power adapter with a charge-pump circuit, a slew-rate controller, and an integrated dual-gate driver to provide RCP and short circuit protection according to one embodiment.

FIG. 2 is a schematic diagram of a USB-PD power adapter 200 with a charge-pump circuit 136, a slew-rate controller 240, and an integrated dual-gate driver 242 to provide RCP and short circuit protection according to one embodiment. Although not all of the components of the USB-PD power adapter 200 are shown, the USB-PD power adapter 200 is the same or similar as the USB-PD power adapter 100 of FIG. 1 as noted by similar reference numbers.

It is worth noting that the VBUS_C terminal 106 is a source of the power FET 114 and the terminal 104 is a gate of the power FET 114. The voltage supply terminal 108 is a source of the power FET 112 and the terminal 102 is a gate of the power FET 112. A node between the power FET 112 and the power FET 114 is a drain for the both power FET 112 and the power FET 114.

In one embodiment, the dual-gate driver 142 includes the charge-pump circuit 136 and the slew-rate controller 240. The charge-pump circuit 136 provides a higher voltage from a lower voltage supply on which the USB-PD power adapter 200 operates. The gates of the power FET 112 and the power FET 114 are driven to a voltage output of the charge-pump circuit 136 through the slew-rate controller 240. The output of the charge-pump circuit 136 goes to the slew-rate controller 240. The slew-rate controller 240 charges the gates of the power FET 112 and the power FET 114 with a constant current (e.g., for soft starting of the power FETs 112 and 114). There are various pull-down transistors (pull-down NFETs) coupled to the gates of the power FETs 112 and 114 which are optionally operating depending on whether an operating mode corresponds to a normal operating mode or a fault condition. Though depicted as pull-down transistors, in the cases where the power FETs are PFETs rather than NFETs, the pull-down transistors could be replaced by pull-up transistors.

It should be noted that the dual-gate driver 142 includes a single charge-pump circuit to drive both power FETs 112 and 114. However, in other embodiments, the dual-gate driver 142 can include a first charge-pump circuit to drive the power FET 112 and a second charge-pump circuit to drive the power FET 114. In some embodiments, the power FET 112 and the power FET 114 can be independently driven.

Having two power FETs (the power FET 112 and the power FET 114) is required to avoid back-current going from the VBUS_C terminal 106 to the voltage supply terminal 108 during an RCP fault (or event). In one embodiment, during an RCP fault, the VBUS_C terminal 106 goes to 24V while the voltage supply terminal 108 goes to 5V. If there were only one power FET, e.g., the power FET 114, then the voltage supply terminal 108 would get shorted to the VBUS_C terminal 106 through the diode 124, which is a parasitic diode of the power FET 114 and an RCP fault may not be prevented.

The slew-rate controller 240 includes two output stacks 262 and 264. The output stack 262 connects to the gate of the power FET 112 and the output stack 264 connects to the gate of the power FET 114. The slew-rate controller 240 includes a programmable current source 210 (programmable Isnk current) for slowly charging the gates of the power FETs 112 and 114 and to control inrush current. In some embodiments, the charging of the gates can be done as a sequence, for example, the gate of the power FET 112 can be charged first via the output stack 262, while the gate of the power FET 114 can be charged subsequently via the output stack 264. The charge-pump circuit 136 powers the slew-rate controller 240 and the programmable current of avoids soft turn-on of the power FETs 112 and 114.

A diode 252 is coupled between an input node 202 and the terminal 102. The input node 202 is an output node from the slew-rate controller 240. A diode 254 is coupled between an input node 204 and the terminal 104. A pull-down transistor 222 is coupled is coupled to the terminal 102. The pull-down transistor 222 receives a first control signal at a gate of the pull down transistor 222. The first control signal is received in response to a reverse current event. The first control signal causes a voltage on the terminal 102 to be pulled down. The pull-down transistor 222 turns the power FET 112 off when there is an RCP event. In one embodiment, the strength of the pull-down transistor 222 is high compared to the strength of a pull-down transistor 212 (that turns the power FET 112 on or off during normal mode operation) so that during an RCP event, the pull-down transistor 222 can turn off the power FET 112 quickly within 100 ns to 200 ns (meaning it is able to discharge a gate capacitance of the power FET 112 of about 3 nF). The diodes 252 and 254 block a high voltage and electrostatic discharge (ESD) during an RCP event from going to the slew-rate controller 240.

A pull-down transistor 224 is coupled is coupled to the terminal 104. The pull-down transistor 224 receives a second control signal at a gate of the pull down transistor 224. The second control signal is received in response to a short circuit event. The second control signal causes a voltage on the terminal 104 to be pulled down. The pull-down transistor 224 turns of the power FET 124 during an SCP event. Similarly to the pull-down transistor 222, a strength of the pull-down transistor 224 is high compared to a strength of a pull-down transistor 214 (that turns the power FET 114 on or off during normal mode operation) so that during an SCP event, the pull-down transistor 224 can turn off the power FET 114 quickly, within 100 ns to 200 ns. During an SCP event, the Vbus terminal 106 gets shorted to a ground terminal while the power FETs 112 and 114 are on, thus creating a very large current and a drain-source voltage (VDS) through the power FETs 112 and 114 that can reduce their reliability. Therefore, the pull-down transistor 224 should be designed in such a way that the gate of the power FET 114 can be turned off immediately (or effectively immediately). In other words, the gate of the power FET 114 should be almost immediately shorted to ground during an SCP even to avoid a build-up of high current through the power FETs 112 and 114. During the RCP and SCP events, it is preferable to turn off the power FETs 112 and 114 as fast as possible.

The pull-down transistor 214 turns the power FET 114 off during normal mode operation with a series of current sinks (for example, sinking 100 uA of current). The gate of the power FET 114 may not allow for direct grounding, but can be soft grounded using the 100 uA current link during normal mode operation. This is due to the fact that if an RCP even occurs, there can be a high crowbar current from the VBUS_C terminal 106 to a diode 208 to the pull-down transistor 214. The current sink of 100 uA limits the crowbar current to 100 uA if an RCP event occurs during normal mode operation.

The diode 208 is coupled between the terminal 104 (e.g., the gate of the power FET 114) and the VBUS_C terminal 106 (e.g., the source of the power FET 114). The diode 208 is required to protect the VGS of 114 during an RCP event. In one embodiment, when an RCP event happens while the power FET 114 is on, the VBUS_C terminal 106 can ramp from 5V to 24V while the gate of the power FET 114 at the terminal 104 is at 10V. Without the diode 208, there would be a differential of 14V (VGS) across the gate and source of the power FET 114. This high VGS could break down the gate oxide of the power FET 114 and physically damage it. The diode 208 ensures that when the voltage at the VVBUS_C bus terminal 106 does higher than the gate voltage of the power FET 114, it conducts and maintains a diode drop difference between the VBUS_C terminal 106 and the terminal 104.

An equalizer circuit 206 is coupled to the terminal 104 and the VBUS_C terminal 106. The equalizer circuit 206 receives a third control signal after the first control signal (e.g., for the RCP event) and shorts the terminal 104 and the VBUS_C terminal 106 for a voltage gate-to-source based shutoff in response to the third control signal. When the equalizer circuit 206 is turned on, it shorts the gate of the power FET 114 (terminal 104) to the source of the power FET 114 (VBUS_C terminal 106) to provide equalization. The equalization is required once an RCP event is detected so that after removal or handling of an RCP event, the gate and the source nodes of the power FET 114 can ramp down at a different ramp rate and a high differential voltage between the gate and source nodes does not develop (e.g., more than the allowed VGS), for example as the VBUS_C terminal 106 ramps down from 24V to 0V (while the terminal 104 can be at 24V).

The pull-down transistor 212 is coupled to the terminal 102 and receives a fourth control signal at a gate of the pull-down transistor 212. The pull-down transistor 212 pulls down the voltage on the terminal 102 to turn off the FET 112 during normal mode operation in response to the fourth control signal. The pull-down transistor 214 is coupled to the terminal 104 and receives a fixed current at the source of the pull-down transistor 214. The pull-down transistor 214 pulls down the voltage on the terminal 104 to turn off the FET 114 in response to the fixed current. The fixed current is applied to the source of the pull-down transistor 214 in response to the fourth control signal.

A pull-down transistor 232 is coupled to the terminal 102 and receives a fifth control signal at a gate of the pull-down transistor 232. The pull-down transistor 232 pulls down the voltage on the terminal 102 in response to the fifth control signal. The pull-down transistor 232 turns off the power FET 112 when there is no voltage supply present from the charge-pump circuit 136 or to the chip but when there is a voltage present on at least one of the voltage supply terminal 108 or the VBUS_C terminal 106. A pull-down transistor 234 is coupled to the terminal 104 and receives the fifth control signal at the gate of the pull-down transistor 234. The pull-down transistor 234 pulls down the voltage on the terminal 104 in response to the fifth control signal. The pull-down transistor 234 turns off the power FET 114 when there is no voltage supply present from the charge-pump circuit 136 or to the chip but there is a voltage present on at least one of the voltage supply terminal 108 or the VBUS_C terminal 106. The pull-down transistors 232 and 234 can prevent current from flowing from the voltage supply terminal 108 to the VBUS_C terminal 106 or vice-versa when the system/chip has no power but at least one of the voltage supply terminal 108 or the VBUS_C terminal 106 is present (e.g., has a voltage).

The charge-pump 136 can receive a set of voltages through an input. In various implementations, the USB-PD power adapter 200 and/or the USB-C controller 116 (and/or any USB subsystem thereof) may detect and/or generate the set of voltages and may provide these voltages as reference voltages to the charge-pump 136. Firmware logic and/or other hardware in the charge-pump 136 can be configured to use the reference voltages to generate at an output of the charge-pump 136, an output signal with a voltage that is sufficient to turn on the power FETs 112 and 114. To turn off the power FETs 112 and 114, USB-PD power adapter 200 (and/or any USB subsystem thereof) can turn off the charge pump 136.

Figure 3:
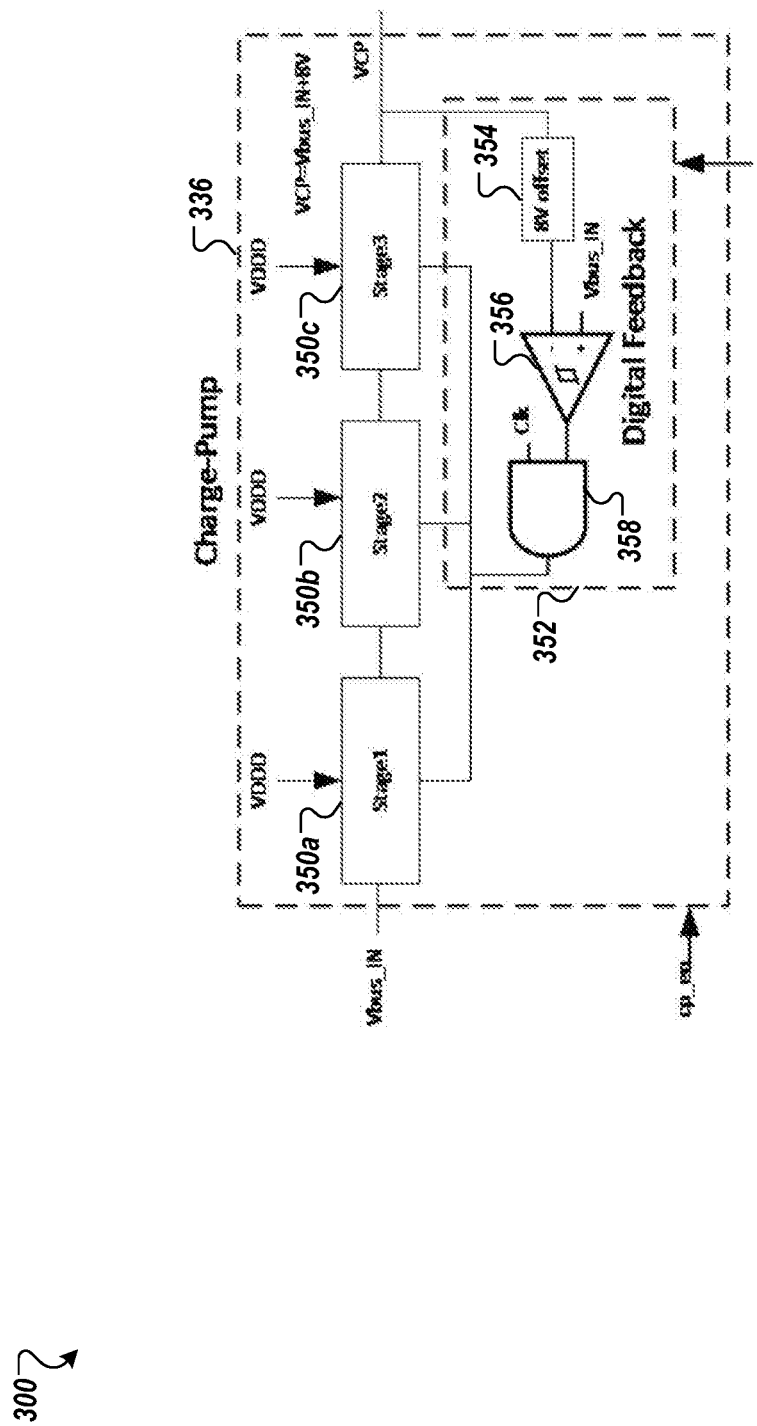
FIG. 3 is a schematic diagram of a charge-pump circuit of a USB-PD power adapter according to one embodiment.

FIG. 3 is a schematic diagram of a charge-pump circuit 336 of a USB-PD power adapter 300 according to one embodiment. Although not all of the components of the USB-PD power adapter 300 are shown, the USB-PD power adapter 300 is the same or similar as the USB-PD power adapter 100 of FIG. 1 as noted by similar reference numbers.

In one embodiment, the charge-pump circuit 336 is a three-stage charge-pump control circuit. A first stage 350a of the three-stage charge-pump circuit is coupled to the input node of the charge-pump (e.g., the input node of the first stage may be the input node of the charge-pump). A second stage 350b of the charge-pump circuit 336 is coupled to an output of the first stage 350a. Further, a third stage 350c is coupled to an output of the second stage 350b. With the three-stage charge-pump, each stage can provide a supply voltage (e.g., VDDD) of 3.3V to 5.5V for a total of between 9V to 16.5V. The input supply (Vbus Ind.) can dynamically change from 3.3V to 21.5V. In order to limit the maximum charge-pump voltage to below the technology limit (e.g., 34V) a control feedback loop 352 may be used. In another embodiment the charge-pump may be a multi-stage charge-pump, with two stages, four stages, or other number of stages.

In one embodiment, the control feedback loop 352 can be a digital feedback loop and includes a voltage offset block 354 (e.g., to offset the voltage by 8V) coupled to the output of the three-stage charge-pump. The control feedback loop 352 further has a comparator 356. The first input of the comparator is coupled to the output of the voltage offset block 354. The second input of the comparator is coupled to the input node (Vbus_IN) of the charge-pump circuit 336. The output of the comparator 356 is coupled to a first input of a logic gate 358. The second input of the logic gate can be coupled to receive a clock signal. In another embodiment, the control feedback loop can be an analog feedback loop (not illustrated in FIG. 3).

The charge-pump circuit 336 with the control feedback loop 352 is to limit the maximum charge-pump voltage to 30V (e.g., below the technology limit) in order to improve the reliability of internal circuits.

Figure 4:
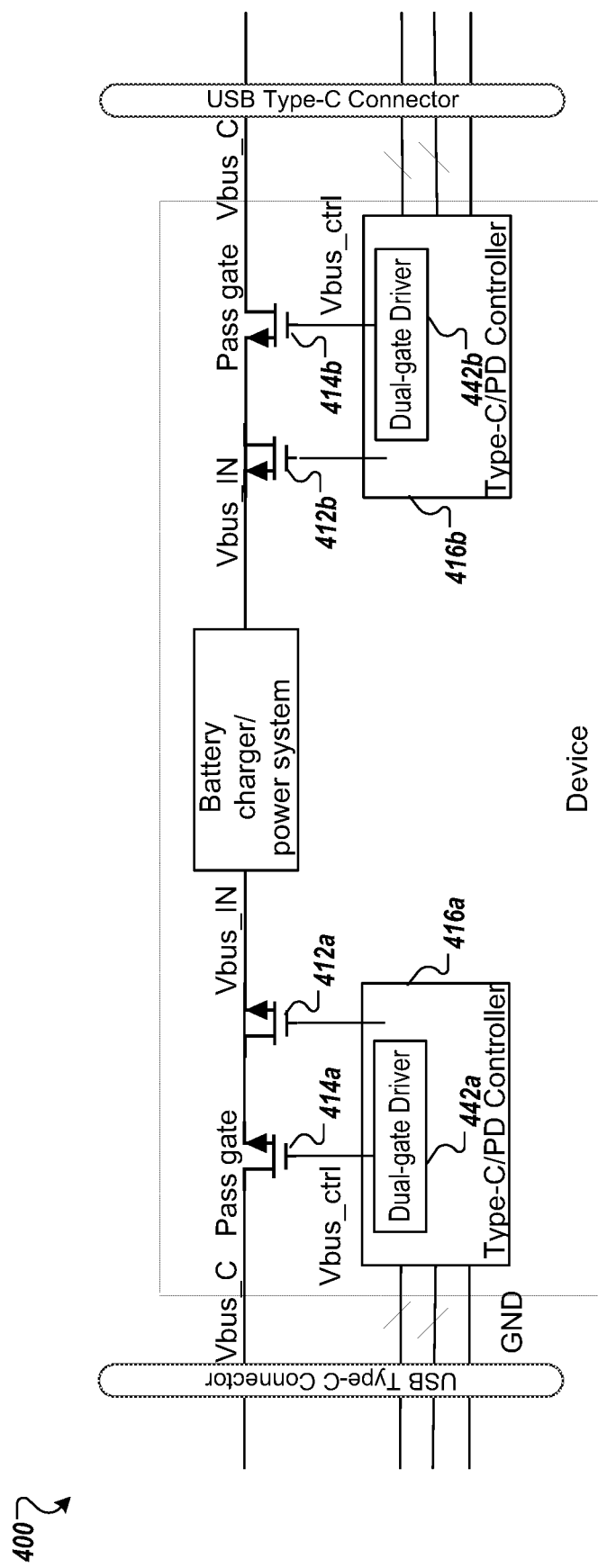
FIG. 4 is a schematic diagram of a USB-PD power device with a dual-gate driver integrated on a USB-C controller to receive power and a dual-gate driver integrated on a USB-C controller to deliver power according to one embodiment.

FIG. 4 is a schematic diagram of a USB-PD power device 400 with a consumer dual-gate driver 442a integrated on a USB-C controller 416a (also referred to as power adapter integrated circuit (IC) controller) to receive power and a provider dual-gate driver 442b integrated on a USB-C controller 416b to deliver power according to one embodiment. When a consumer device is connected to the USB-PD power device 400, the provider dual-gate driver 442b may enable or disable provider FETs 412b and 414b (e.g., similar to power FETs 112 and 114 of FIG. 1) in order to deliver power to the attached consumer device. For example, the provider dual-gate driver 442b may enable the provider FETs 412b and 414b when power is to be delivered to the attached consumer device. Alternatively or in addition, the provider dual-gate driver 442b may disable the provider FETs 414b and 414b when power is not to be delivered to the attached consumer device.

The USB-PD power device 400 can also be a consumer device and may be a USB-PD power consumer with a consumer dual-gate driver 442a integrated on a USB-C controller 416a of the consumer device, to receive power from an attached power provider device (e.g., to charge a battery of the USB-PD power device 400) in one embodiment. When the power provider device is connected to the USB-PD power device 400, (e.g., serving as a power supply), the consumer dual-gate driver 442a may enable or disable consumer FETs 4142a and 414a in order to receive power from the attached provider device. For example, the consumer dual-gate driver 442a may enable the consumer FETs 412a and 414a when power is to be received from the attached provider device to charge a battery, in one embodiment. Alternatively or in addition, the consumer dual-gate driver 442a may disable the consumer FETs 412a and 414b when power is not to be received from the power provider device.

Figure 5:
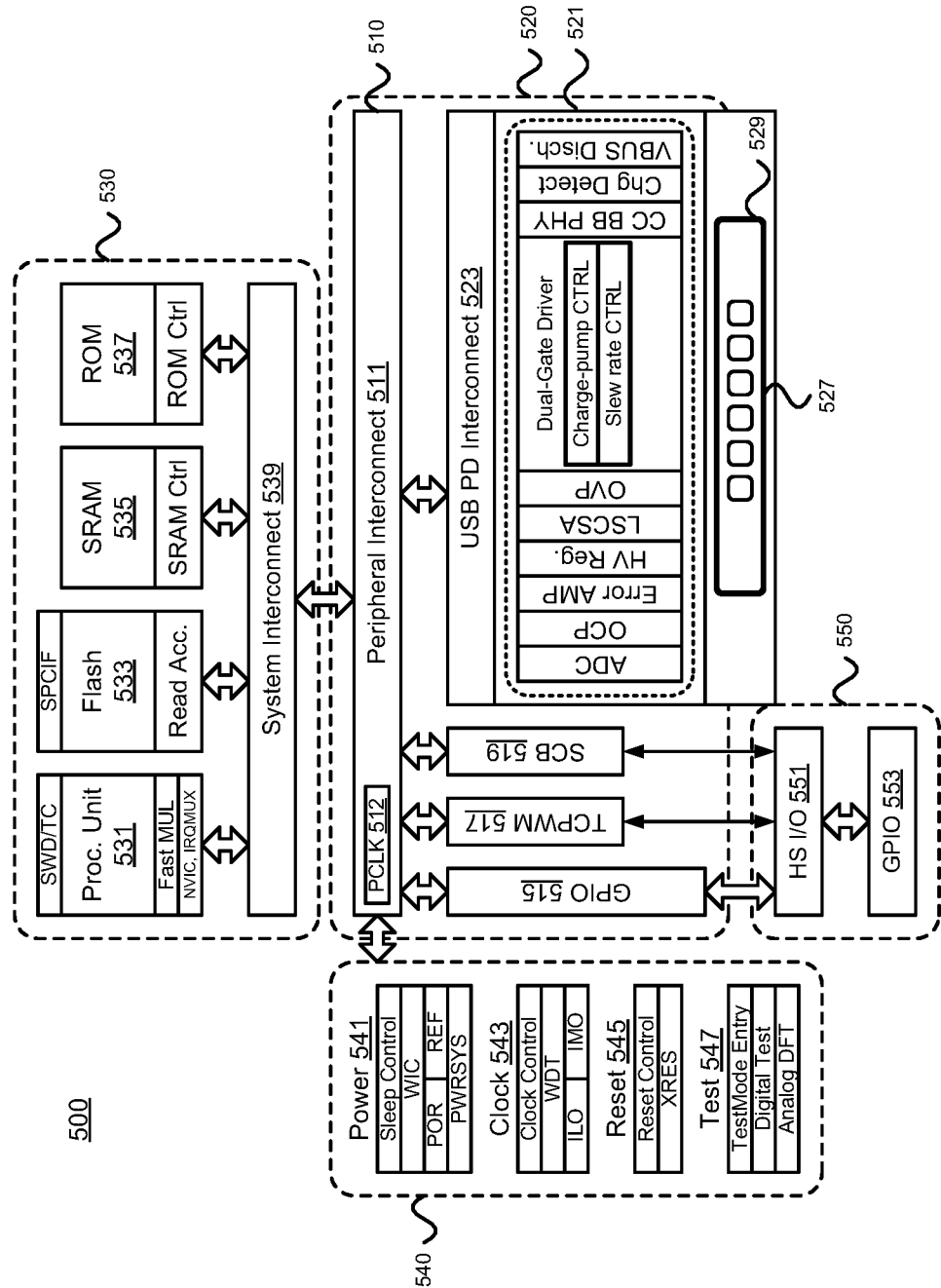
FIG. 5 is a block diagram illustrating a system for a USB device for use in USB power delivery in accordance with some embodiments.

FIG. 5 is a block diagram illustrating a system 500 for a USB device for use in USB power delivery in accordance with some embodiments. System 500 may include a peripheral subsystem 510 including a number of components for use in USB-PD. Peripheral subsystem 510 may include a peripheral interconnect 511 including a clocking module, peripheral clock (PCLK) 512 for providing clock signals to the various components of peripheral subsystem 510. Peripheral interconnect 511 may be a peripheral bus, such as a single-level or multi-level advanced high-performance bus (AHB), and may provide a data and control interface between peripheral subsystem 510, CPU subsystem 530, and system resources 540. Peripheral interconnect 511 may include controller circuits, such as direct memory access (DMA) controllers, which may be programmed to transfer data between peripheral blocks without input by, control of, or burden on CPU subsystem 530.

The peripheral interconnect 511 may be used to couple components of peripheral subsystem 510 to other components of system 500. Coupled to peripheral interconnect 511 may be a number of general purpose input/outputs (GPIOs) 515 for sending and receiving signals. GPIOs 515 may include circuits configured to implement various functions such as pull-up, pull-down, input threshold select, input and output buffer enabling/disable, single multiplexing, etc. Still other functions may be implemented by GPIOs 515. One or more timer/counter/pulse-width modulator (TCPWM) 517 may also be coupled to the peripheral interconnect and include circuitry for implementing timing circuits (timers), counters, pulse-width modulators (PWMs) decoders, and other digital functions that may operate on I/O signals and provide digital signals to system components of system 500. Peripheral subsystem 510 may also include one or more serial communication blocks (SCBs) 519 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 510 may include a USB power delivery subsystem 520 coupled to the peripheral interconnect and comprising a set of USB-PD modules 521 for use in USB power delivery. USB-PD modules 521 may be coupled to the peripheral interconnect 511 through a USB-PD interconnect 523. USB-PD modules 521 may include an analog-to-digital conversion (ADC) module for converting various analog signals to digital signals; an error amplifier (AMP) for regulating the output voltage on VBUS line per a PD contract; a high-voltage (HV) regulator for converting the power source voltage to a precise voltage (such as 3.5-5V) to power system 500; a low-side current sense amplifier (LSCSA) for measuring load current accurately, an over voltage protection (OVP) module and an over-current protection (OCP) module for providing over-current and over-voltage protection on the VBUS line with configurable thresholds and response times; one or more gate drivers for external power field effect transistors (FETs) used in USB power delivery in provider and consumer configurations; and a communication channel PHY (CC BB PHY) module for supporting communications on a Type-C communication channel (CC) line. USB-PD modules 521 may also include a charger detection module for determining that a charging circuit is present and coupled to system 500 and a VBUS discharge module for controlling discharge of voltage on VBUS. In particular, the one or more gate drivers for external power FETs comprises a secondary gate driver integrated on the secondary-side controller to control a gate-source clamp voltage of the external power FET (e.g., provider FET) and control a slew rate of the external power FET, wherein the slew rate corresponds to a gate capacitance of the external power FET. As described with reference to FIGS. 1-4, the dual-gate driver comprises a charge-pump circuit and a slew-rate controller. The discharge control module may be configured to couple to a power source node on the VBUS line or to an output (power sink) node on the VBUS line and to discharge the voltage on the VBUS line to the desired voltage level (i.e., the voltage level negotiated in the PD contract). USB power delivery subsystem 520 may also include pads 527 for external connections and electrostatic discharge (ESD) protection circuitry 529, which may be required on a Type-C port. USB-PD modules 521 may also include a communication module for retrieving and communicating information stored in non-volatile memory one controller with another controller, such as between a primary-side controller and a secondary-side controller of a flyback converter.

GPIO 515, TCPWM 517, and SCB 519 may be coupled to an input/output (I/O) subsystem 550, which may include a high-speed (HS) I/O matrix 551 coupled to a number of GPIOs 553. GPIOs 515, TCPWM 517, and SCB 519 may be coupled to GPIOs 553 through HS I/O matrix 551.

System 500 may also include a central processing unit (CPU) subsystem 530 for processing commands, storing program information, and data. CPU subsystem 530 may include one or more processing units 531 for executing instructions and reading from and writing to memory locations from a number of memories. Processing unit 531 may be a processor suitable for operation in an integrated circuit (IC) or a system-on-chip (SOC) device. In some embodiments, processing unit 531 may be optimized for low-power operation with extensive clock gating. In this embodiment, various internal control circuits may be implemented for processing unit operation in various power states. For example, processing unit 531 may include a wake-up interrupt controller (WIC) configured to wake the processing unit up from a sleep state, allowing power to be switched off when the IC or SOC is in a sleep state. CPU subsystem 530 may include one or more memories, including a flash memory 533, and static random access memory (SRAM) 535, and a read-only memory (ROM) 537. Flash memory 533 may be a non-volatile memory (NAND flash, NOR flash, etc.) configured for storing data, programs, and/or other firmware instructions. Flash memory 533 may include a read accelerator and may improve access times by integration within CPU subsystem 530. SRAM 535 may be a volatile memory configured for storing data and firmware instructions accessible by processing unit 531. ROM 537 may be configured to store boot-up routines, configuration parameters, and other firmware parameters and settings that do not change during operation of system 500. SRAM 535 and ROM 537 may have associated control circuits. Processing unit 531 and the memories may be coupled to a system interconnect 539 to route signals to and from the various components of CPU subsystem 530 to other blocks or modules of system 500. System interconnect 539 may be implemented as a system bus such as a single-level or multi-level AHB. System interconnect 539 may be configured as an interface to couple the various components of CPU subsystem 530 to each other. System interconnect 539 may be coupled to peripheral interconnect 511 to provide signal paths between the components of CPU subsystem 530 and peripheral subsystem 510.

System 500 may also include a number of system resources 540, including a power module 541, a clock module 543, a reset module 545, and a test module 547. Power module 541 may include a sleep control module, a wake-up interrupt control (WIC) module, a power-on-reset (POR) module, a number of voltage references (REF), and a PWRSYS module. In some embodiments, power module 541 may include circuits that allow system 500 to draw and/or provide power from/to external sources at different voltage and/or current levels and to support controller operation in different power states, such as active, low-power, or sleep. In various embodiments, more power states may be implemented as system 500 throttles back operation to achieve a desired power consumption or output. Clock module 543 may include a clock control module, a watchdog timer (WDT), an internal low-speed oscillator (ILO), and an internal main oscillator (IMO). Reset module 545 may include a reset control module and an external reset (XRES) module. Test module 547 may include a module to control and enter a test mode as well as testing control modules for analog and digital functions (digital test and analog DFT).

System 500 may be implemented in a monolithic (e.g., single) semiconductor die. In other embodiments, various portions or modules of system 500 may in implemented on different semiconductor dies. For example, memory modules of CPU subsystem 530 may be on-chip or separate. In still other embodiments, separate-die circuits may be packaged into a single "chip," or remain separate and disposed on a circuit board (or in a USB cable connector) as separate elements.

System 500 may be implemented in a number of application contexts to provide USB-PD functionality thereto. In each application context, an IC controller or SOC implementing system 500 may be disposed and configured in an electronic device (e.g., a USB-enabled device) to perform operations in accordance with the techniques described herein. In one example embodiment, a system 500 may be disposed and configured in a personal computer (PC) power adapter for a laptop, a notebook computer, etc. In another example embodiment, system 500 may be disposed and configured in a power adapter (e.g., a wall charger) for a mobile electronic device (e.g., a smartphone, a tablet, etc.). In another example embodiment, system 500 may be disposed and configured in a wall socket that is configured to provide power over USB Type-A and/or Type-C port(s). In another example embodiment, system 500 may be disposed and configured in a car charger that is configured to provide power over USB Type-A and/or Type-C port(s). In yet another example embodiment, system 500 may be disposed and configured in a power bank that can get charged and then provide power to another electronic device over a USB Type-A or Type-C port. In other embodiments, a system like system 500 may be configured with the power switch gate control circuitry described herein and may be disposed in various other USB-enabled electronic or electro-mechanical devices.

It should be understood that a system, like system 500 implemented on or as an IC controller may be disposed into different applications, which may differ with respect to the type of power source being used and the direction in which power is being delivered. For example, in the case of a car charger, the power source is a car battery that provides DC power, while in the case of a mobile power adapter the power source is an AC wall socket. Further, in the case of a PC power adapter the flow of power delivery is from a provider device to consumer device, while in the case of a power bank the flow of power delivery may be in both directions depending on whether the power bank is operating as a power provider (e.g., to power another device) or as a power consumer (e.g., to get charged itself). For these reasons, the various applications of system 500 should be regarded in an illustrative rather than a restrictive sense.

Figure 6:
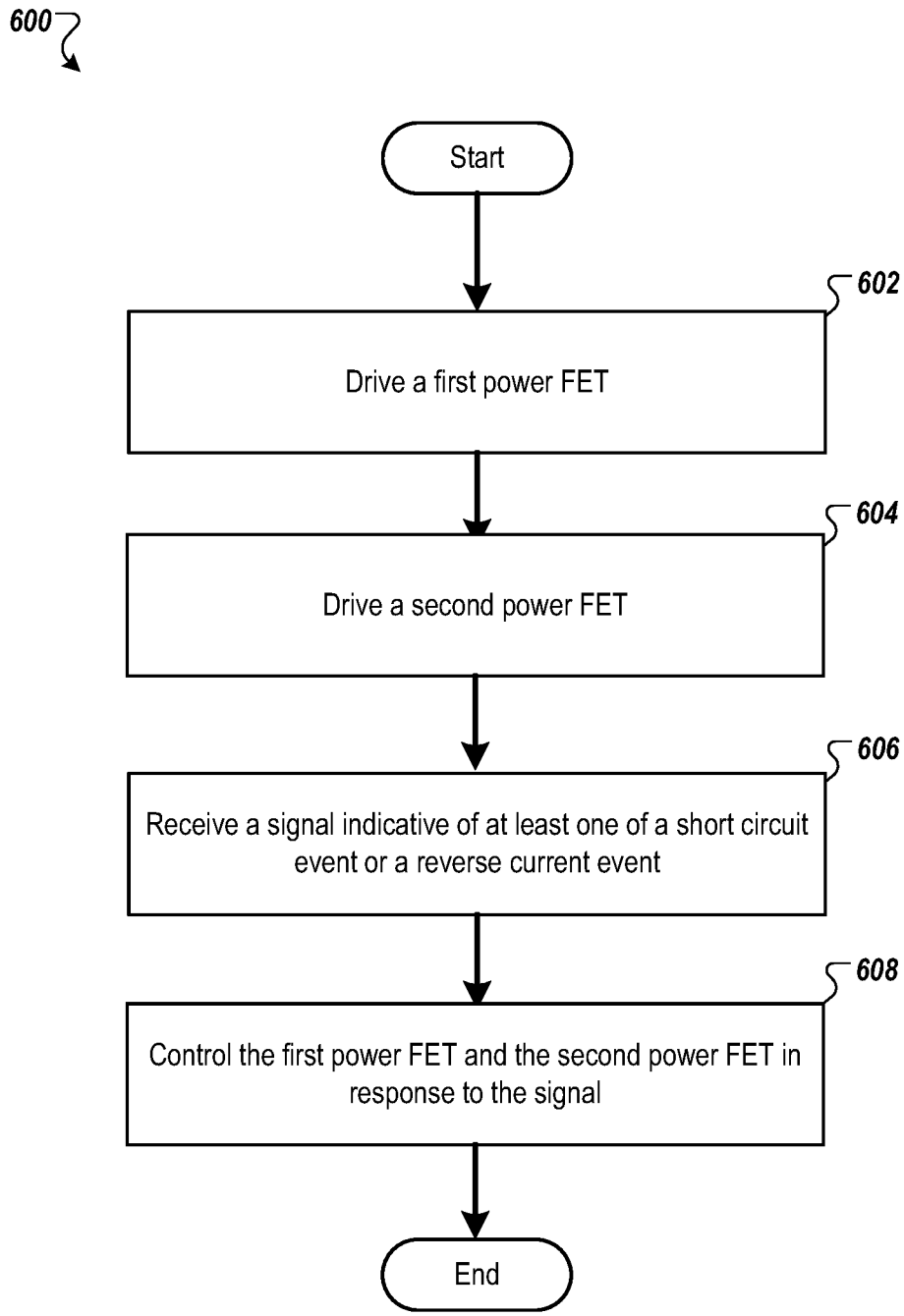
FIG. 6 is a flow diagram of a method of a fault protection scheme for a USB-PD power adapter according to one embodiment.

FIG. 6 is a flow diagram of a method 600 of a fault protection scheme for a USB-PD power adapter according to one embodiment. The method 600 may be performed by processing logic that comprises hardware (e.g., circuitry, dedicated logic, programmable logic, microcode, etc.), software, firmware, or a combination thereof. In one embodiment, the method 600 may be performed by any of the processing devices described herein. In one embodiment, the method 600 is performed by the USB-C controller 116 of FIG. 1. In another embodiment, the method 600 is performed by the dual-gate driver 242 of FIG. 2. In one embodiment, the processing logic executes a firmware-based method that performs the following operations. In another embodiment, the processing logic has embedded code or logic and is configured to execute instructions to perform the following operations.

The method 600 begins by the processing logic driving a first power FET that is coupled to a first terminal of an integrated circuit (IC) controller of a USB-enabled device (block 602). The processing logic also drivers a second power FET (block 604). The second power FET and the first power FET are connected in series between a VBUS_C terminal of a USB Type-C connector and a voltage supply to deliver power to the Vbus terminal. A breakdown voltage of each of the first power FET and the second power FET is substantially less than 20V (typically 8V). The processing logic receives a signal (block 606). The signal is indicative of at least one of a short circuit event or a reverse current event (or other system fault). The processing logic controls the first power FET and the second power FET in response to the signal (block 608); the method 600 ends.

In another embodiment, the signal is at least one of a first signal or a second signal. The processing logic receives the first signal in response to the reverse current event. The processing logic pulls down a first voltage on the first terminal in response to the first control signal using a first pull-down transistor. The processing logic receives the second control signal in response to the short circuit event. The processing logic pulls down a second voltage on the second terminal using a second pull-down transistor in response to the second control signal.

In another embodiment, the processing logic receives a third control signal after the first control signal and shorts the second terminal and the Vbus terminal using an equalizer circuit in response to the third signal.

In another embodiment, the processing logic receives a fourth control signal. The processing logic pulls down the first voltage on the first terminal using a third pull-down transistor in response to the third control signal. The processing logic receives a fixed current at a source of a fourth pull-down transistor. The processing logic pulls down the second voltage on the second terminal using the fourth pull-down transistor in response to the fourth control signal.

In another embodiment, the processing logic receives a fifth control signal. The processing logic pulls down the first voltage on the first terminal using a fifth pull-down transistor in response to the fifth control signal. The processing logic pulls down the second voltage on the second terminal using a sixth pull-down transistor in response to the fifth control signal. The fifth control signal indicates that there is no voltage supply present but there is a voltage present on at least one of the first terminal or the second terminal.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "driving," "receiving," "controlling," "pulling down," "shorting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A Universal Serial Bus Type-C (USB-C) controller comprising:
   a first terminal;
   a second terminal; and
   a dual-gate driver comprising:
      a first diode coupled between a first input node and a first terminal;
      a first transistor coupled to the first terminal, wherein the first transistor is configured to receive a first control signal at a gate of the first transistor in response to a reverse current event and pull down a first voltage on the first terminal in response to the first control signal;
      a second diode coupled between a second input node and a second terminal; and
      a second transistor coupled to the second terminal, wherein the second transistor is configured to receive a second control signal at a gate of the second transistor in response to a short circuit event and pull down a second voltage on the second terminal in response to the second control signal, wherein the dual-gate driver is configured to:
         drive a first power field effect transistor (FET) coupled to the first terminal;
         drive a second power FET coupled to the second terminal, the first power FET and the second power FET being connected in series between a voltage bus (VBUS_C) terminal of a USB Type-C connector and a voltage supply to deliver power to the VBUS_C terminal, wherein a breakdown voltage of each of the first power FET and the second power FET is less than 20 volts (V); and
         control the first power FET and the second power FET in response to at least one of the short circuit event or the reverse current event.

2. The USB-C controller of claim 1, further comprising:
   a charge pump circuit; and
   a slew-rate controller coupled between the charge pump circuit and the dual-gate driver.

3. The USB-C controller of claim 1, wherein:
   the first power FET and the second power FET are N-channel FETs (NFET).

4. The USB-C controller of claim 1, wherein the dual-gate driver further comprises:
   a third diode coupled between the second terminal and the VBUS_C terminal; and
   an equalizer circuit coupled to the second terminal and the VBUS_C terminal, wherein the equalizer circuit is configured to receive a third control signal after the first control signal and short the second terminal and the VBUS_C terminal in response to the third control signal.

5. The USB-C controller of claim 1, wherein the dual-gate driver further comprises:
    a third transistor coupled to the first terminal, wherein the third transistor is configured to receive a third control signal at a gate of the third transistor and pull down the first voltage on the first terminal in response to the third control signal; and
    a fourth transistor coupled to the second terminal, wherein the fourth transistor is configured to receive a fixed current at a source of the fourth transistor and pull down the second voltage on the second terminal in response to the fixed current, wherein the fixed current is applied to the source of the fourth transistor in response to the third control signal.

6. The USB-C controller of claim 1, wherein the dual-gate driver further comprises:
    a fifth transistor coupled to the first terminal, wherein the fifth transistor is configured to receive a fourth control signal at a gate of the fifth transistor and pull down the first voltage on the first terminal in response to the fourth control signal, wherein the fourth control signal is indicative of no power being provided to the USB-C controller; and
    a sixth transistor coupled to the second terminal, wherein the sixth transistor is configured to receive the fourth control signal at a gate of the sixth transistor and pull down the second voltage on the second terminal in response to the fourth control signal.

7. The USB-C controller of claim 1, wherein the dual-gate driver comprises a first gate driver and a second gate driver that are integrated gate drivers and the first power FET and the second power FET are external power FETs.

8. A method for a Universal Serial Bus (USB)-enabled device comprising an integrated circuit (IC) controller, the method comprising:
    driving, by a dual-gate driver of the IC controller, a first power field effect transistor (FET) coupled to a first terminal of the IC controller;
    driving, by the dual-gate driver, a second power FET coupled to a second terminal of the IC controller, the first power FET and the second power FET being connected in series between a voltage bus (VBUS_C) terminal of a USB Type-C connector and a voltage supply to deliver power to the VBUS_C terminal, wherein a breakdown voltage of each of the first power FET and the second power FET is less than 20 volts (V);
    receiving, by the dual-gate driver, a signal indicative of at least one of a short circuit event or a reverse current event;
    controlling, by the dual-gate driver, the first power FET and the second power FET in response to the signal, wherein the signal is one of a first control signal or a second control signal;
    receiving, by the dual-gate driver, the first control signal in response to the reverse current event;
    pulling down, by the dual-gate driver, a first voltage on the first terminal in response to first control signal using a first transistor,
    receiving, by the dual-gate driver, the second control signal in response to the short circuit event; and
    pulling down, by the dual-gate driver, a second voltage on the second terminal using a second transistor in response to second control signal.

9. The method of claim 8, further comprising:
    receiving, by the dual-gate driver, a third control signal after the first control signal; and
    shorting, by the dual-gate driver, the second terminal and the VBUS_C terminal using an equalizer circuit in response to the third control signal.

10. The method of claim 8, further comprising:
    receiving, by the dual-gate driver, a third control signal; and
    pulling down, by the dual-gate driver, the first voltage on the first terminal using a third transistor in response to the third control signal; or
    receiving, by the dual-gate driver, a fixed current at a source of a fourth transistor; and
    pulling down, by the dual-gate driver, the second voltage on the second terminal using the fourth transistor in response to the third control signal.

11. The method of claim 8, further comprising:
    receiving, by the dual-gate driver, a fourth control signal;
    pulling down, by the dual-gate driver, the first voltage on the first terminal using a fifth transistor in response to the fourth control signal, wherein the fourth control signal is indicative of no power being provided to the USB-C controller; and
    pulling down, by the dual-gate driver, the second voltage on the second terminal using a sixth transistor in response to the fourth control signal.

12. A system comprising:
    an integrated Universal Serial Bus (USB) controller comprising a first terminal, a second terminal, and a dual-gate driver the dual-gate driver comprising:
        a first diode coupled between a first input node and a first terminal;
        a first transistor coupled to the first terminal, wherein the first transistor is configured to receive a first control signal at a gate of the first transistor in response to a reverse current event and pull down a first voltage on the first terminal in response to first control signal;
        a second diode coupled between a second input node and a second terminal; and
        a second transistor coupled to the second terminal, wherein the second transistor is configured to receive a second control signal at a gate of the second transistor in response to a short circuit event and pull down a second voltage on the second terminal in response to the second control signal;
    a first external field effect transistor (FET) coupled to the first terminal; and
    a second external FET coupled to the second terminal, wherein the first external FET and the second external FET are connected in series between a voltage bus (VBUS_C) terminal of a USB Type-C connector and a voltage supply to deliver power to the VBUS_C terminal, wherein a breakdown voltage of each of the first external FET and the second external FET is less than 20 volts (V), and wherein the dual-gate driver is configured to:
        drive the first external FET;
        drive the second external FET; and
        control the first external FET and the second external FET in response to at least one of the short circuit event or the reverse current event.

13. The system of claim 12, wherein the dual-gate driver comprises:
    a single charge pump circuit; and a slew-rate controller coupled between the single charge pump circuit and the dual-gate driver.

14. The system of claim 12, wherein:
the first external FET and the second external FET are N-channel FETs (NFET).

15. The system of claim 12, wherein the dual-gate driver further comprises:
a third diode coupled between the second terminal and the VBUS_C terminal; and
an equalizer circuit coupled to the second terminal and the VBUS_C terminal, wherein the equalizer circuit is configured to receive a third control signal after the first control signal and short the second terminal and the VBUS_C terminal in response to the third control signal.

16. The system of claim 12, wherein the dual-gate driver further comprises:
a third transistor coupled to the first terminal, wherein the third transistor is configured to receive a third control signal at a gate of the third transistor and pull down a first voltage on the first terminal in response to the third control signal; and
a fourth transistor coupled to the second terminal, wherein the fourth transistor is configured to receive a fixed current at a source of the fourth transistor and pull down a second voltage on the second terminal in response to the fixed current, wherein the fixed current is applied to the source of the fourth transistor in response to the third control signal.

17. The system of claim 12, wherein the dual-gate driver further comprises:
a fifth transistor coupled to the first terminal, wherein the fifth transistor is configured to receive a fourth control signal at a gate of the fifth transistor and pull down the first voltage on the first terminal in response to the fourth control signal, wherein the fourth control signal is indicative of no power being provided to the USB-C controller; and
a sixth transistor coupled to the second terminal, wherein the sixth transistor is configured to receive the fourth control signal at a gate of the sixth transistor and pull down the second voltage on the second terminal in response to the fourth control signal.

18. The system of claim 12, wherein the integrated USB controller comprises a USB-Power Delivery (USB-PD) subsystem.

19. The system of claim 12, wherein the integrated USB controller comprises a USB Type-C subsystem.

* * * * *